Nov. 11, 1924.                    1,515,014

C. F. DOWNS

SLICING APPARATUS

Filed Feb. 25, 1924

INVENTOR
*Charles F. Downs.*

BY
*C. T. Henkel,*
ATTORNEY

Patented Nov. 11, 1924.

1,515,014

UNITED STATES PATENT OFFICE.

CHARLES F. DOWNS, OF CLEVELAND, OHIO.

SLICING APPARATUS.

Application filed February 25, 1924. Serial No. 694,822.

*To all whom it may concern:*

Be it known that I, CHARLES F. DOWNS, a citizen of the United States, residing in Cleveland, county of Cuyahoga, and State of Ohio, have invented a new and useful Improvement in Slicing Apparatus, of which the following is a specification.

My invention relates, generally, to apparatus for storing and slicing objects and, particularly, to slicing apparatus wherein the slicing is indexed and the slicing knife is, normally, supported in an out of the way position but ready for operation.

The main object of my invention is an efficient but economical slicing apparatus which is always ready for operation and which is easy and convenient of operation and which retains either the solid object or the slices thereof, either wholly or partly sliced, in position either during the slicing operation or thereafter. Other objects will appear during the description of the apparatus shown in the accompanying drawing.

My invention is illustrated in the accompanying drawing as applied to a bread slicing device mounted in a bread container. I am aware, however, that modifications as to applications of my invention as well as to structural details may be made within the scope of the appended claims.

Figure 1:
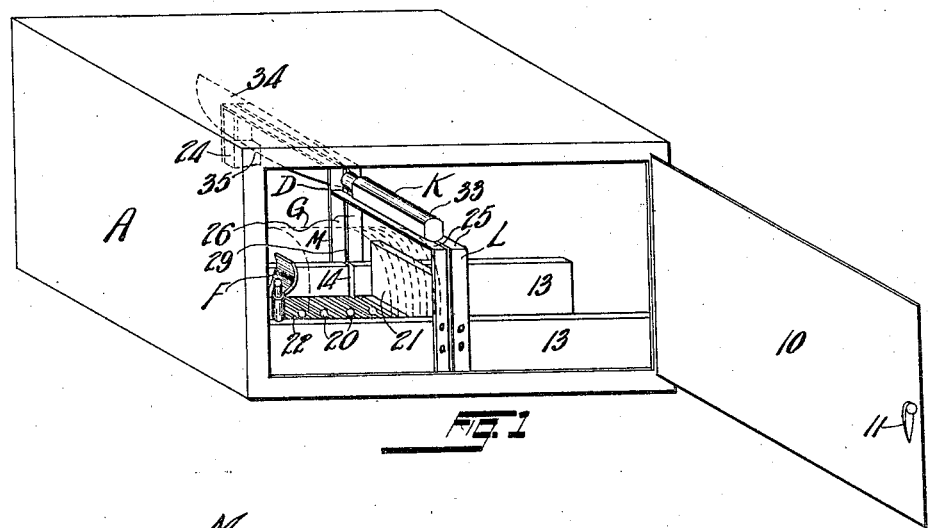
Figure 2:
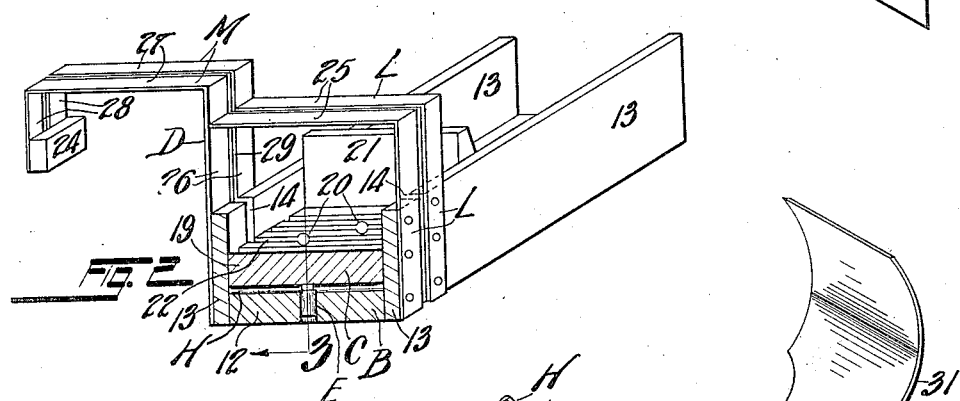
Figure 5:
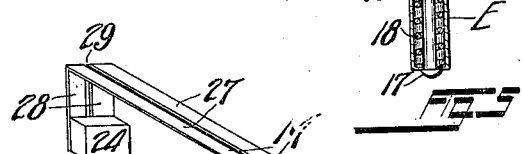
Figure 3:
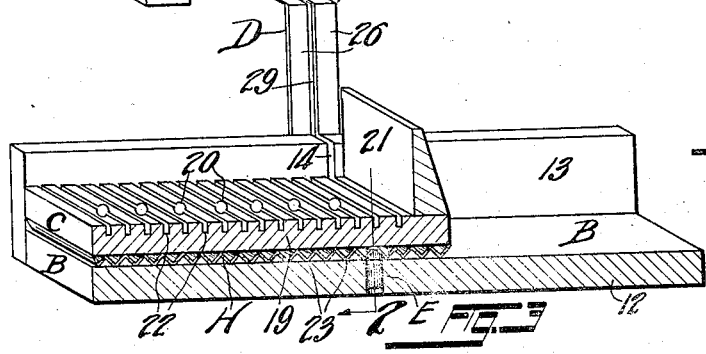
Figure 4:
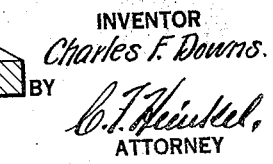

In this accompanying drawing, Fig. 1 is a perspective view of a bread container with the door open showing a certain bread slicing device located therein and the bread storage space behind the slicing device and the slicing knife in the out of the way but ready for operation position and a partly sliced loaf of bread (in dotted lines) held longitudinally on the table; Fig. 2 is a sectional perspective view showing the transverse relation between the elements, the section being taken on a vertical transverse plane indicated by the line 2 in Fig. 3; Fig. 3 is a sectional perspective view showing the longitudinal relation between the elements, the section being taken on a vertical longitudinal plane indicated by the line 3 in Fig. 2; Fig. 4 is a perspective view, on a larger scale, showing a resilient bracket to hold either the solid loaf of bread or the slices thereof or the sliced and solid portions thereof against the abutment; and Fig. 5 is a section, on a larger scale, of the index pawl.

Similar reference characters refer to similar parts throughout the views.

The bread container A may be made in any convenient form or manner and is provided, on the front, with the door 10 having the lock 11.

The slicing device itself rests on the bottom of the container, inside and near the front thereof, for convenient operation thereof.

This slicing device is composed, principally, of the base B, the table C, and the bracket D.

The base B has the bottom 12 and the upwardly and longitudinally extending guides 13 which guide the table C and the loaf G sidewise and are provided with the slots 14 to permit the blade of the slicing knife K to cut clear through the loaf of bread.

The index pawl E, shown on a larger scale in Fig. 5, is disposed in the bottom 12 a little to one side of the slots 14 and comprises the shell 15, the plunger 16 operating in this shell and retained therein by the riveted over head 17, and the spring 18 acting on the head of the plunger 16 to force the same upward into the corrugations of the rack H but permit the same to be forced downward while the table is moved. Other forms of index pawls may be used.

The table C fits slidably between the guides 13 and has the bottom 19 which is provided with the holes 20 into either of which the resilient bracket F may be inserted to form a resilient abutment for one end of the loaf G. The rigid abutment 21 is secured to one end of the table C and extends upward therefrom and serves as an abutment for the other end of the loaf G.

The bracket F is intended to force the loaf G against the abutment 21 to not only hold the loaf in position but also to press the loaf, either solid or partly sliced or wholly sliced, against the abutment 21 for the purpose of excluding the air from the cut surfaces of the loaf to prevent drying out thereof. The cross slots 22 are provided in the table C, in proper relation to the corrugations of the rack H, to permit the blade of the knife K to cut through the loaf G easily.

The rigid abutment 21 may be replaced by a movable abutment either similar to the abutment F or otherwise movable on the table so that the loaf G and this abutment 21 may move on the table or on the base. In this instance, a rack similar to the rack H may conveniently be arranged on the guides 13 and a pawl similar to the pawl E may be mounted in the abutment 21. This arrangement is not shown in the drawing but appears obvious from the description previously given.

The rack H is secured to the under side of the table and, in the present instance and for economical reasons, is formed of corrugated metal and extends the full length and the full width of the table. The upper end of the plunger 16 is adapted to engage these corrugations to index the table as will appear presently.

The bottom high points 23 of the corrugations of the rack H rest and slide on the base B, thereby not only relieving the friction between the table and the base but also preventing the crumbs which fall down on the base while slicing the bread from interfering with the sliding of the table on the base. Other forms of rack may be used.

The bracket D serves the purpose of supporting the slicing knife K in an out of the way position while the same is not in use and to guide the blade of this knife while the same is cutting the bread to cut the slices even.

The bracket D is, in the present instance and for economical reasons, composed of two pairs of duplicate members connected to each other by the block 24 which is secured to the outer ends of the pair of members.

Each of these pairs of members comprises the front standard L and the rear standard M.

Each of the front standards L is, in the present instance and for economical reasons, made of commercial band iron and has the horizontal portion 25 extending to the rear standard M, and the lower end thereof is secured to the front guide 13.

Each of the rear standards M is, in the present instance and for economical reasons, made of commerical band iron and has the upright portion 26 having the lower end thereof secured to the inner guide 13 and extending upward and above the portion 25, and further has the horizontal portion 27 and the downwardly extending portion 28 to the lower end of which the block 24 is secured.

These two pairs of members are spaced apart to form the slot 29 between them sufficiently wide to guide the blade of the knife K therebetween.

The bracket F (Fig. 4) comprises the stem 30, the bottom of which is adapted to enter either one of the holes 20, and the resilient member 31, the bottom of which is secured to the stem 30 and has the wings 32 which enter the slots 22 to prevent the rotation of the bracket F in the holes 20. This resilient member 31 is provided to exert a certain pressure against one end of the loaf G to hold the same, or the slices thereof, against the abutment 21 as previously mentioned.

When not in operation, the knife K rests on the top of the bracket D, above the loaf G, and out of the way so that the loaf can be manipulated without interfering with or handling the knife. In this position, the handle 33 of the knife rests on the horizontal portions 25 of the bracket D while the blade 34 of the knife is disposed in the slot 29 with the edge 35 downward ready for operation and is held in this position by the portions 26, 27, and 28, the edge 35 resting on the block 24 which is made of wood or other material which will not injure the edge 35. In this out of the way position, the knife is always ready for use and the handle 33 is always within convenient reach of the operator.

When it is desired to slice the loaf G and the same is in position for slicing on the table, the operator takes hold of the handle 33 and moves the knife forward and downward. During this movement, the blade of the knife is guided in the slot 29 and cuts the slices straight and even.

In order to slice the loaf G, place the same on the table C and abut one end thereof on the abutment 21 and one side thereof against one of the guides 13; then insert the bracket F into the nearest hole 20 outside of the other end of the loaf whereupon the resilient member 31 retains the loaf against the abutment 21. Then take hold of the loaf and push the same as well as the table longitudinally on the base B until that point of the loaf where the slicing is to start is located opposite the slots 29 and until you can feel that the pawl 16 has entered one of the corrugations of the rack H; then move the knife forward and downward, as previously described for operation, and thereby slice the loaf. Then raise the knife up in the slot 29; then move the loaf and the table longitudinally until you feel that the pawl 16 has been depressed and has entered the next or other desired corrugation of the rack H; then again move the knife forward and downward to again cut the loaf and continue these operations until all or any desired portion of the loaf has been sliced.

During this slicing operation, the bracket F always retains the loaf and the slices against the abutment 21, therefore all slices will be cut alike and straight.

The slices so cut may readily be removed from the table or may be left thereon for future use. When a portion of the loaf has been sliced and these slices have been removed, the cut end of the loaf may be moved against the abutment 21 and followed up by the bracket F to hold this cut end against the abutment 21 and thereby prevent this end from drying out. When the entire loaf or only a portion thereof has been sliced and when these slices are to remain on the table C, the resilient member 31 of the bracket F will retain these cut surfaces against each other and will retain the loaf portion against the slices and will retain the whole mass against the abutment 21 and thereby prevent the cut portions from drying out.

I am aware that slicing devices have been made; therefore I do not claim that feature broadly, but I do claim:—

1. A slicing apparatus, including, a bracket means having upright portions provided with a slot to guide the blade of a slicing knife while the same is in operation, a horizontal portion for the handle of said knife to rest upon while the same is not in operation, means to support the front portion of said blade while the same is not in operation, and means to retain said blade in position ready for operation.

2. A slicing apparatus, including, a bracket means comprising upright portions to guide the rear and the front portions of the blade of a slicing knife while the same is in operation, a horizontal portion between said upright portions for the handle of said knife to rest upon while the same is not in operation, and means to support said blade in position ready for operation.

3. A slicing apparatus, including, a stationary base, a table manually movable and indexable on said base and adapted to carry an object to be sliced, a rack on said table, and a resilient pawl mounted in said base and the end thereof adapted to engage said rack to indicate when said table is moved to indexed position.

4. A slicing apparatus, including, a stationary base, means for guiding a slicing knife in a definite path while the same is in operation, a table manually movable and indexable on said base and adapted to carry an object to be sliced, a resilient pawl mounted in said base and the end thereof adapted to engage said table to indicate when the same is moved to indexed position, and said table provided with slots in the top thereof and spaced to align with said path of the knife when said table is indexed to prevent the edge of said knife from contacting said table.

5. A slicing apparatus, including, a table provided with a series of apertures, an abutment on one end of said table, and an abutment bracket comprising a stem adapted to be inserted into either one of said apertures, and a resilient member to bear against an object to be sliced and to retain this object against said abutment.

6. A slicing apparatus, including, a stationary base, means for guiding a slicing knife in a definite path while the same is in operation, a table indexable on said base and provided with a series of apertures and with slots in the top thereof spaced to align with said path of the knife when said table is indexed to prevent the edge of said knife from contacting said table, an abutment on one end of said table, and an abutment bracket comprising a stem adapted to be inserted into either one of said apertures, and a resilient member to bear against an object to be sliced and to retain the same against said abutment.

7. A slicing apparatus, including, a base, a table on said base and adapted to carry the object to be sliced, means for guiding the blade of a slicing knife while the same is in operation and for supporting this knife in an out of the way but ready for operation position while the same is not in operation, said guide and support means composed of two members disposed side by side with a space therebetween to form a guide slot for said knife blade, each of said members comprising a vertical leg portion having the bottom thereof secured to said base, a horizontal portion adapted to support the handle end of said knife in said out of the way but ready for operation position, a horizontal portion adapted to retain said knife blade in vertical position, a downwardly extending portion adapted to further retain said knife blade in vertical position, and a block connecting said downwardly extending portions for supporting the blade of said knife in said out of the way but ready for operation position without injury to the edge of said knife.

8. A slicing apparatus, including, a bracket adapted to guide the blade of a slicing knife while the same is in operation and provided with means for resting said knife on the top thereof in out of the way but ready for operation position.

9. A slicing apparatus adapted to be inclosed in and operated in a container having a door in the front wall thereof, including, a stationary base resting on the floor of said container and against the front wall thereof, means for carrying an object to be sliced, a bracket secured to said base and extending upward from each side thereof within the boundaries of the opening for said door, means on said bracket to guide the blade of a slicing knife while the same is slicing said object, the handle of said knife projecting outside of said container through said door opening while said object is being sliced, means on said bracket for resting said knife on the top of said bracket within said container, and means for retaining said blade of the knife in position ready for slicing while said knife is resting on said bracket.

10. A slicing apparatus adapted to be inclosed in and operated in a container having a door, including, means for carrying an object to be sliced, means for guiding the blade of a slicing knife while the same is slicing said object, the handle of said knife projecting outside of said container through the opening for said door while said object is being sliced, and means for resting said knife on the top of said bracket with said blade in ready for slicing position but within said container.

CHARLES F. DOWNS.